US008219109B2

(12) United States Patent
Cahill (10) Patent No.: US 8,219,109 B2
(45) Date of Patent: Jul. 10, 2012

(54) MULTIPROTOCOL INTERFERENCE AVOIDANCE IN MONOPROTOCOL RADIO COMMUNICATIONS SYSTEM

(75) Inventor: Stephen Cahill, Felton, CA (US)

(73) Assignee: Plantronics, Inc., Santa Cruz, CA (US)

( * ) Notice: Subject to any disclaimer, the term of this patent is extended or adjusted under 35 U.S.C. 154(b) by 14 days.

(21) Appl. No.: 12/814,100

(22) Filed: Jun. 11, 2010

(65) Prior Publication Data

US 2011/0306367 A1 Dec. 15, 2011

(51) Int. Cl.
*H04W 88/02* (2009.01)

(52) U.S. Cl. ...................................................... 455/455

(58) Field of Classification Search ................... 455/455, 455/456.1–456.6; 370/329, 338, 354, 401
See application file for complete search history.

(56) References Cited

U.S. PATENT DOCUMENTS

| 2003/0237037 A1* | 12/2003 | Soundararajan | 714/748 |
| 2008/0220788 A1* | 9/2008 | Stanwood et al. | 455/450 |
| 2011/0051703 A1* | 3/2011 | Fulknier et al. | 370/338 |

* cited by examiner

*Primary Examiner* — Diane Mizrahi
(74) *Attorney, Agent, or Firm* — Chuang Intellectual Property Law (57) ABSTRACT

In one example, a method and system for selecting a channel for use with a mobile communication device is described. A first wireless communications protocol network parameter associated with a first wireless communications protocol is monitored. A second wireless communications protocol operating channel is selected utilizing the monitored parameter data associated with the first wireless communications network.

25 Claims, 8 Drawing Sheets

| Channel # | Frequency |
|---|---|
| CH 0 | 5.745 GHz |
| CH 1 | 5.765 GHz |
| CH 2 | 5.785 GHz |
| CH 3 | 5.805 GHz |
| CH 4 | 5.825 GHz |

202 (Channel #), 204 (Frequency)

| Channel | Traffic |
|---------|---------|
| CH 0 | Traffic 0 |
| CH 1 | Traffic 1 |
| CH 2 | Traffic 2 |
| CH 3 | Traffic 3 |
| CH 4 | Traffic 4 |

| Channel | Interference |
|---------|--------------|
| CH 0 | INT 0 |
| CH 1 | INT 1 |
| CH 2 | INT 2 |
| CH 3 | INT 3 |
| CH 4 | INT 4 |

MULTIPROTOCOL INTERFERENCE AVOIDANCE IN MONOPROTOCOL RADIO COMMUNICATIONS SYSTEM

BACKGROUND OF THE INVENTION

Multiple wireless communication protocols may often simultaneously operate within the same radiofrequency band. For example, a variety of wireless communication protocols operate in the industrial, scientific, and medical (ISM) band defined by the ITU-R in 5.138, 5.150, and 5.280 of the radio regulations. These wireless communication protocols operating in the ISM band include band converted variations of the digital enhanced cordless telecommunications (DECT) protocol, IEEE 802.11 (also referred to herein simply as "802.11"), and Bluetooth. Where multiple wireless communication protocols are simultaneously in operation in a given region, interference across networks can undesirably affect performance of one or more systems.

For example, a DECT system monitors channels using a least-interfered-channel/listen-before-talk algorithm to select a channel and timeslot to use, and a move-on-error algorithm to change channels when corruption is observed on a link already set up. Unfortunately, for the case of sharing spectrum between a DECT-protocol-derivative product and an 802.11-protocol service, DECT's least-interfered channel algorithm does not detect 802.11-protocol usage of 802.11 channels efficiently.

Figure 1:
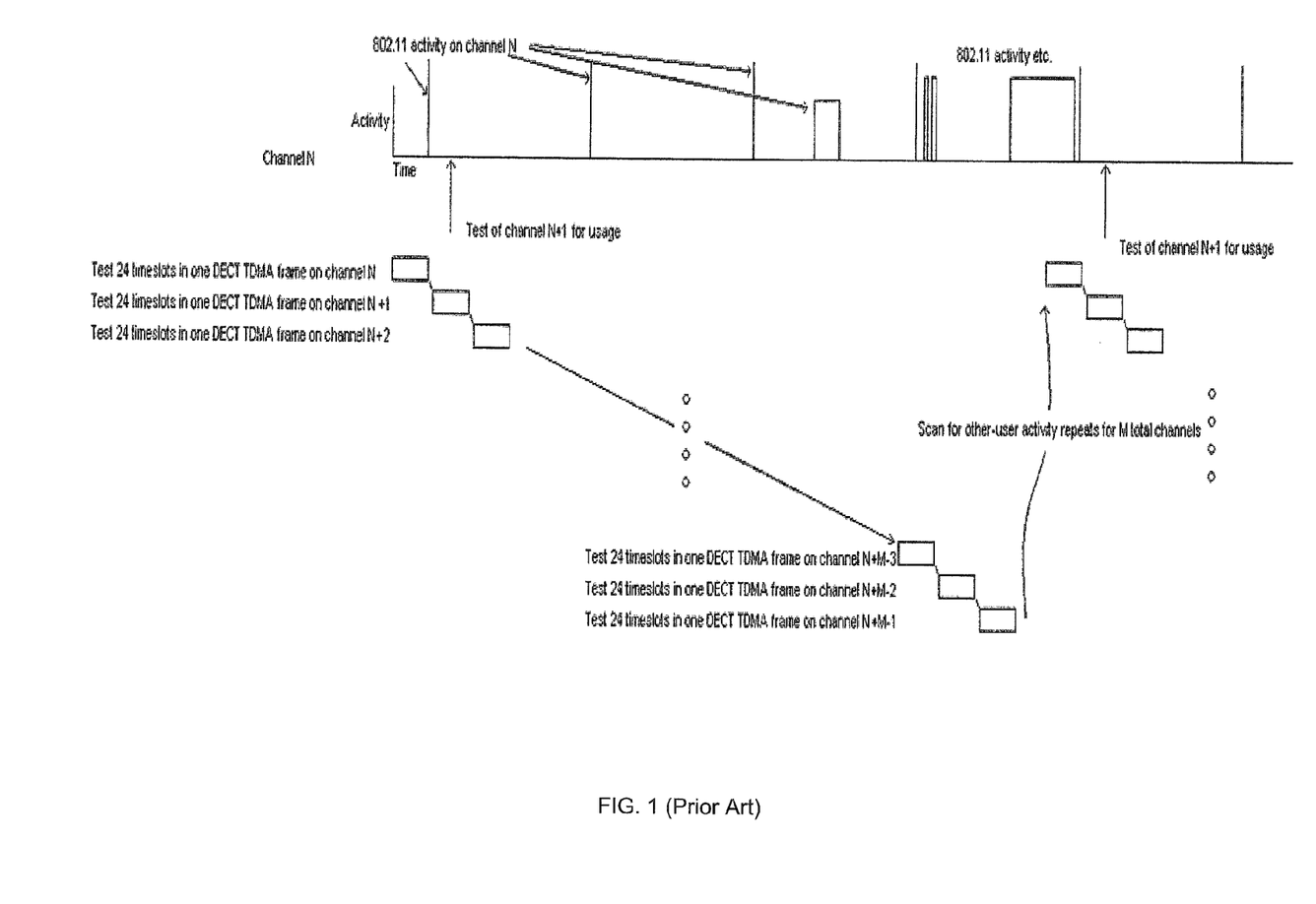
FIG. 1 illustrates scanning for network activity in a prior art system.

FIG. 1 illustrates the detection method which DECT-derived products use to validate that a channel is free to use prior to starting transmissions on that channel. The DECT-derived system checks the candidate channel list periodically, looking at the signal level during one DECT timeslot, from time to time, to see if that timeslot is unused on that channel. The prior art DECT scanning system utilizes a round-robin scanning algorithm. The scanning algorithm tests twenty-four timeselots in one DECT TDMA frame on channel N, N+1, N+2 . . . N+M−3, N+M−2, N+M−1. The scan for other user activity repeats for M total channels. If the interference source is continuous, or if it repeats at 10 mS intervals, the testing will catch the usage of the channel by the other user. 802.11 usage, though, may be at other rates; commonly the 802.11 access points transmit a beacon every 100 mS, but data may be present or not at any time on the channel. The test of channel N may miss IEEE 802.11 activity on channel N in the round-robin period scanning algorithm.

In one prior art solution, an IT manager using a central management tool configures the DECT system by assigning certain channels for use. The IEEE 802.11 system is separately configured to use channels from its own selectable channel list which would not overlap with the selected DECT channels in use. While this approach addresses some of the technical issues, it requires action by the IT manager and does not result in an individual DECT unit being optimally configured for the environment in its physical proximity.

Thus, improved systems and methods for services in a shared frequency band provided by different protocols are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for radio system channel selection are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to radio communications systems operating in frequency bands which may be shared with other systems incorporating incompatible protocols. In one example, a wireless communications device implements at least one protocol operating in selectable channels in a frequency band. At least one element of the wireless communications device communicates with a computing device (such as a laptop or desktop computer) using a communications means such as a USB interface.

The computing device incorporates a wireless communications feature such as an 802.11-protocol function also operating on channels within the same frequency band. The computing device's wireless communications feature incorporates scanning and monitoring functionality such that data indicating the 802.11 channels used, signal levels, and communications message traffic levels for 802.11 access points and clients in the area, including the computing device's own usage of the frequency band for 802.11 client or soft-access-point functionality, is collected. The collected data is communicated from the computing device to the wireless communications device by means of the communications means. Channels for operation by the wireless communications device are selected by means of an algorithm using the data, the selection at the direction of the algorithm, among other means, operating to reduce the interference from the wireless communications device with the communications using 802.11 of the computing device, or the other 802.11 access points and clients in the area, and to reduce the interference from the 802.11 features of the computing device or the other 802.11 access points and clients in the area to the wireless communications device.

Optionally, the wireless communications device may perform scanning and monitoring functionality by means of the one protocol, by means which data indicating the one protocol's channels used, signal levels, and communications message traffic levels in the area, and including the wireless communications device's own usage of the frequency band, is collected. The data is communicated from the wireless communications device to the computing device by means of the communications means.

In one example implementation, a laptop that a wireless headset adapter is plugged into via USB has 802.11 channel scanning active. The laptop passes this scanning information (channels in use and RSSI levels observed, traffic levels for the channels observed) to the wireless headset adapter, which uses the information, along with its own scanning data, to select a channel which will result in the least mutual interference with the 802.11 system. And optionally the wireless headset adapter passes its own channel being used and other DECT user data to the laptop for it to use to possibly choose the best access point with.

In one example, a system for selecting a channel from a plurality of channels at a mobile communication device includes a computing device, a USB device, and a mobile communication device. The computing device includes a first wireless transceiver operable to transmit and receive data using a first wireless communications protocol, a monitoring application configured to monitor one or more first wireless communications protocol network parameters associated with the first wireless communications protocol, and a USB interface. The USB device is adapted to couple to the USB interface, where the USB device includes a second wireless transceiver operable to transmit and receive data using a second wireless communications protocol. The mobile communication device includes a third wireless transceiver operable to transmit and receive data to and from the USB device using the second wireless communications protocol. The mobile communication device is adapted to receive the one or more first wireless communications protocol network parameters from the USB device and responsively select a second wireless communications protocol channel from a plurality of channels to transmit or receive data. Alternatively, the computing device or the USB device is adapted to process the one or more first wireless communications protocol network parameters and responsively select a second wireless communications protocol channel to transmit or receive data to or from the mobile communication device.

In one example, a system for selecting a channel from a plurality of channels at a mobile communication device includes a computing device and a mobile communication device. The computing device includes a first wireless transceiver operable to transmit and receive data using a first wireless communications protocol, a monitoring application configured to monitor first wireless communications protocol network data, and a second wireless transceiver operable to transmit and receive data using a second wireless communications protocol. The mobile communication device includes a third wireless transceiver operable to transmit and receive data to and from the second wireless transceiver, where the mobile communication device is adapted to receive first wireless communications protocol network data and responsively select a second wireless communications protocol channel to communicate with the computing device. Alternatively, the computing device is adapted to process the first wireless communications protocol network data and responsively select a second wireless communications protocol channel to transmit or receive data to or from the mobile communication device.

In one example, a method for selecting a channel at a mobile communication device includes monitoring a first wireless communications protocol network parameter associated with a first wireless communications protocol and transmitting the monitored parameter data to a mobile communication device utilizing a second wireless communications protocol. The method includes receiving the monitored parameter data at the mobile communication device, and selecting a second wireless communications protocol operating channel utilizing the monitored parameter data.

In one example, a method for selecting a channel at a mobile communication device includes receiving at a headset network data associated with a first wireless communications protocol, where the network data is received over a second wireless communications protocol. A channel quality is monitored for each channel of the second wireless communications protocol available for use. The method includes selecting a second wireless communications protocol operating channel at the headset utilizing the network data associated with the first wireless communications protocol and the channel quality on each channel of the second wireless communications protocol available for use.

In one example, a mobile communication device includes a processor, a transceiver to transmit and receive data using a wireless communications protocol, an antenna, and a memory. The memory stores a channel selection application configured to receive a plurality of network data associated with a different wireless communications protocol, where the channel selection application is configured to select a channel from a plurality of available channels using the plurality of network data associated with the different wireless communications protocol.

In one example described herein, configuration of a DECT based system operating in an area where there are also 802.11a or n systems in use is advantageously automatically enabled. Each DECT unit is tuned (and periodically retuned) to use spectrum where the least mutual interference will occur, and can optimally avoid hidden listener mutual interference with the computer that it is plugged into.

Figure 2:
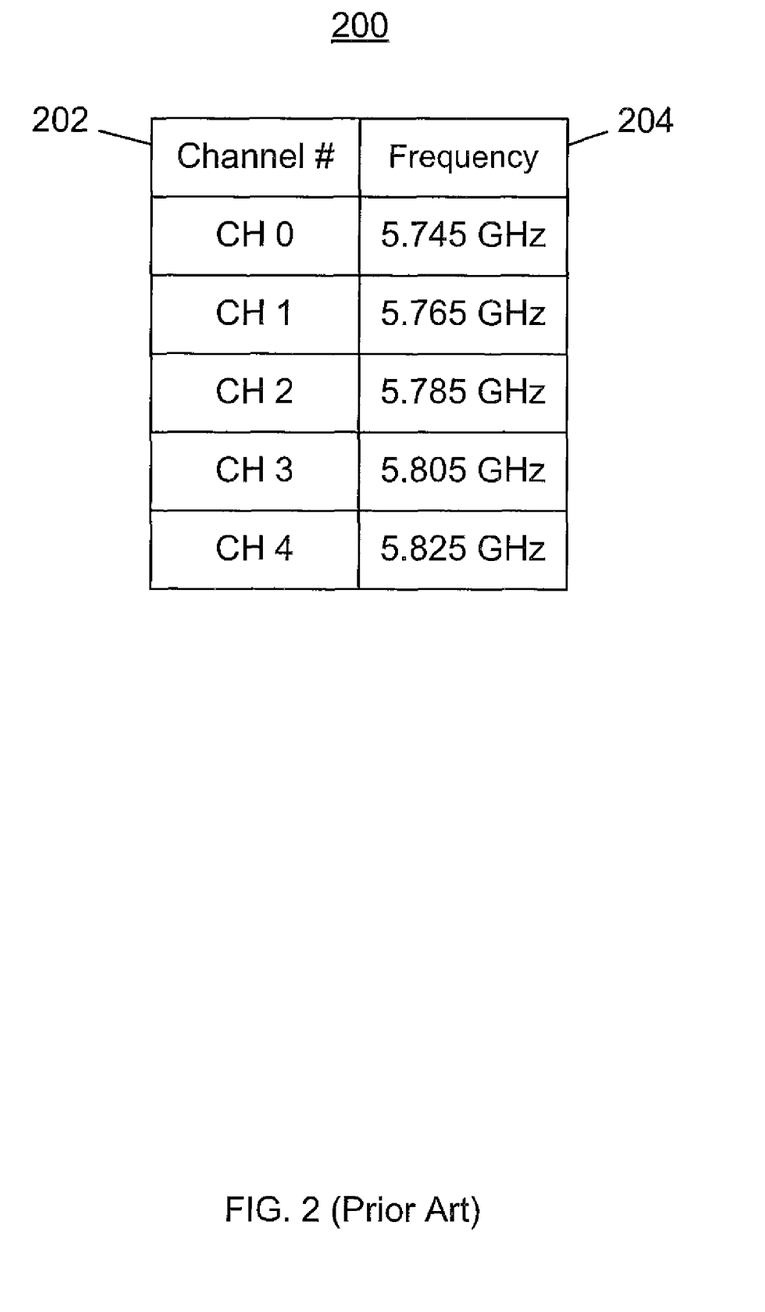
FIG. 2 illustrates channels associated with a first wireless communications protocol in one example.

FIG. 2 illustrates channels associated with a first wireless communications protocol in one example. In the example table 200 shown in FIG. 2, channels for an IEEE 802.11 network having five channels are shown, with the channels centered between 5.745 GHz and 5.825 GHz, with each channel 20 MHz wide. Table 200 shows an overview of channel numbers 202 and their frequency 204. For a 5.8 GHz 802.11 network, the band plan varies depending on the regulatory limitations in different regions, and is generally in several blocks. Table 200 represents a standardized implementation in the USA. One of ordinary skill in the art will recognize that other implementations having different numbers of channels and center frequencies may be utilized in further examples.

Figure 3:
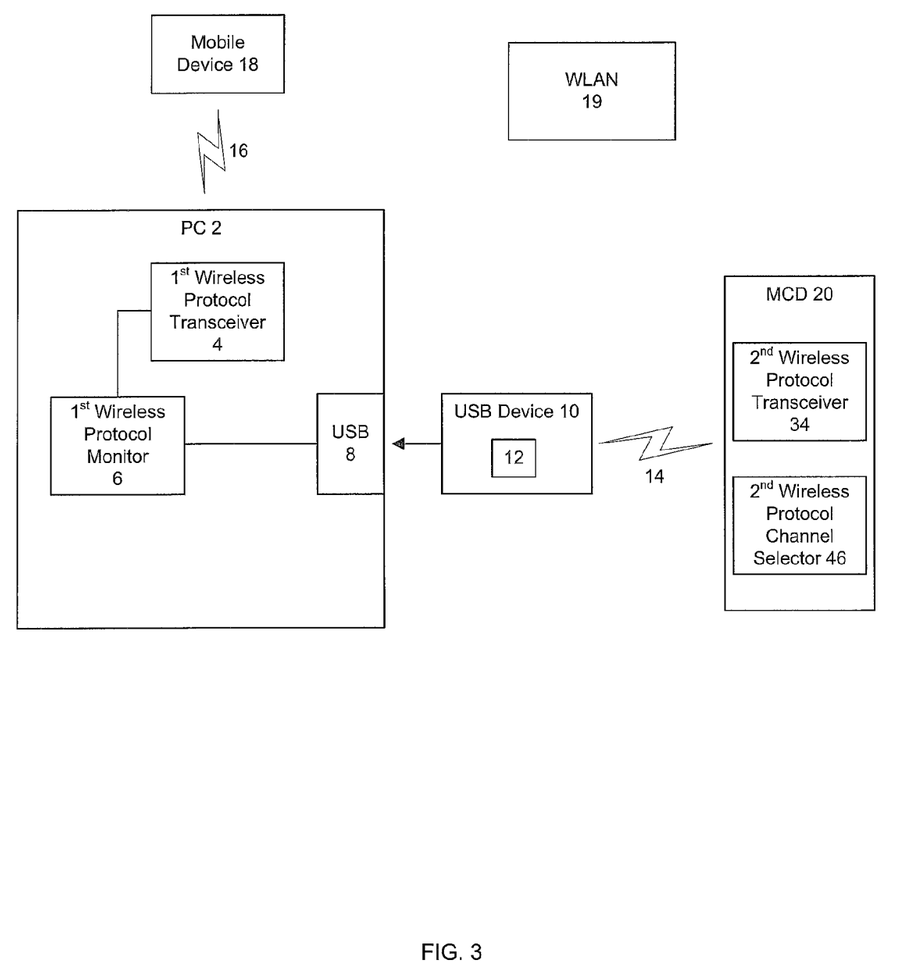
FIG. 3 illustrates a system for selecting a channel at a mobile communication device.

FIG. 3 illustrates a system for selecting a channel for use with a mobile communication device. The system includes a computing device 2, a USB device 10, and a mobile communication device 20. In one example, the computing device 2 is a personal computer and the mobile communication device 20 is a wireless headset. The computing device 2 includes a first wireless transceiver 4 operable to transmit and receive data using a first wireless communications protocol, a monitoring application 6 configured to monitor one or more first wireless communications protocol network parameters associated with the first wireless communications protocol, and a USB interface 8. For example, the one or more first wireless communications network parameters monitored may include channels utilized, signal levels, and communications message traffic levels for wireless communications network access points and clients in the vicinity of the computing device 2.

Figure 5:
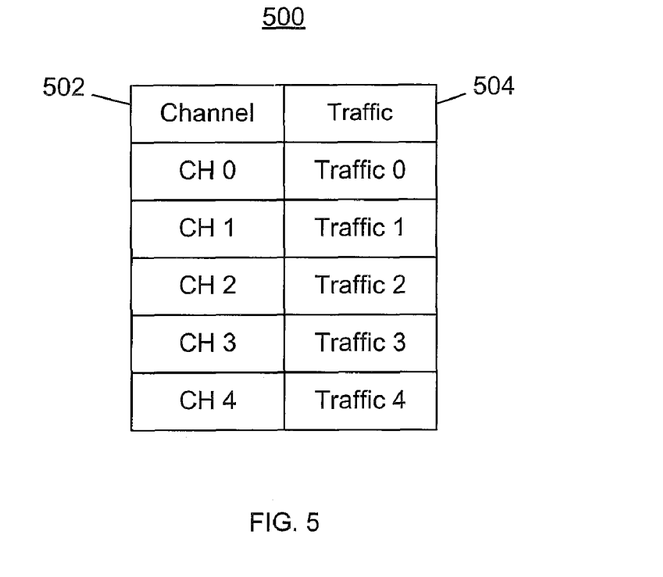
FIG. 5 illustrates monitored network activity associated with channel network traffic of a first wireless communications protocol.
Figure 6:
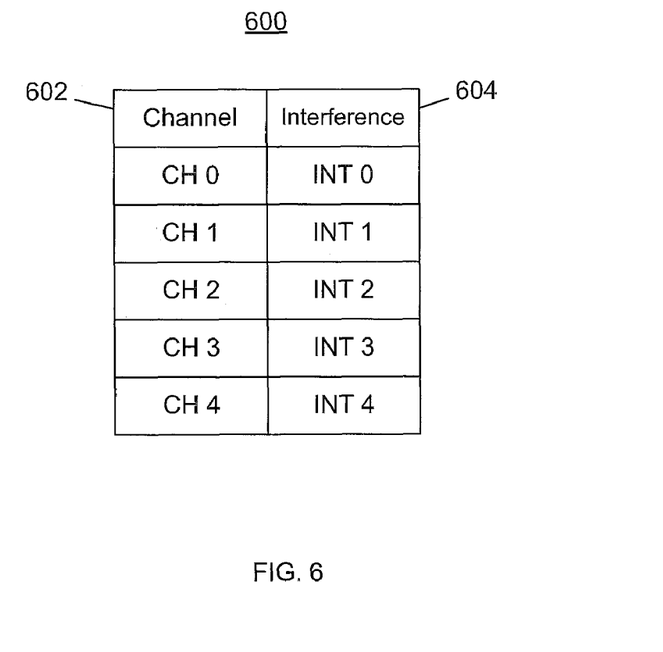
FIG. 6 illustrates monitored network activity associated with channel interference levels of a first wireless communications protocol.

For example, the monitored traffic and/or interference levels are stored for transmission to mobile communication device 20 as shown in FIG. 5 and FIG. 6. FIG. 5 illustrates monitored network activity associated with channel network traffic of a first wireless communications protocol. In the example shown in FIG. 5, a lookup table 500 has been generated containing an ordered list of channels 502 and their measured traffic levels 504. Channel CH 0 has a measured traffic level Traffic 0, channel CH 1 has a measured traffic level Traffic 1, channel CH 2 has a measured traffic level Traffic 2, and so forth.

FIG. 6 illustrates monitored network activity associated with channel interference levels of a first wireless communications protocol. In the example shown in FIG. 6, a lookup table 600 has been generated containing an ordered list of channels 602 and their measured interference levels 604. Channel CH 0 has a measured interference level INT 0, channel CH 1 has a measured interference level INT 1, channel CH 2 has a measured interference level INT 2, and so forth.

In one example, the one or more first wireless communications network parameters are associated with use of the first wireless transceiver 4. This may include the channels on which the wireless transceiver 4 is currently utilizing to transmit or receive data. The monitoring application 6 is configured to monitor traffic or interference levels on each available channel capable of being utilized by the wireless transceiver 4. Referring to FIG. 3, this usage may result from communications between computing device 2 and a mobile device 18 over a wireless link 16 utilizing the first wireless communications protocol.

In a further example, the first wireless communications network parameters are associated with use of the first wireless communications protocol unrelated to the use of the first wireless transceiver 4. Referring again to FIG. 3, such usage may be result from a wireless local area network 19 utilizing the first wireless communications protocol.

The USB device 10 is adapted to couple to the USB interface 8, where the USB device 10 includes a second wireless transceiver 12 operable to transmit and receive data using a second wireless communications protocol. In one example, the first wireless communications protocol is an IEEE 802.11 protocol and the second wireless communications protocol is a DECT protocol.

The mobile communication device 20 includes a second wireless communications protocol transceiver 34 operable to transmit and receive data to and from the USB device 10 using the second wireless communications protocol over a wireless link 14. The mobile communication device 20 is adapted to receive the one or more first wireless communications protocol network parameters from the USB device 10 and responsively select a second wireless communications protocol channel from a plurality of channels using a second wireless protocol channel selector 46 to transmit or receive data. In one example where first wireless communications protocol network parameters are the channels on which the first wireless transceiver is currently utilizing to transmit or receive data, the mobile communication device 20 responsively selects a second wireless communications protocol channel not overlapping with the first wireless transceiver channels in use. In a further example, the USB device 10 receives the one or more first wireless communications protocol network parameters and responsively select a second wireless communications protocol channel using a second wireless protocol channel selector.

The mobile communication device 20 is configured to monitor the interference levels on each second wireless communications protocol channel capable of being selected to transmit or receive data. In one example, the one or more first wireless communications protocol network parameters received are traffic or interference levels on each available channel capable of being utilized by the first wireless transceiver 4. The mobile communication device 20 selects the second wireless communications protocol channel having the least traffic or interference level in view of the received traffic or interference levels associated with the first wireless communications protocol and the interference levels on each second wireless communications protocol channel.

Figure 4:
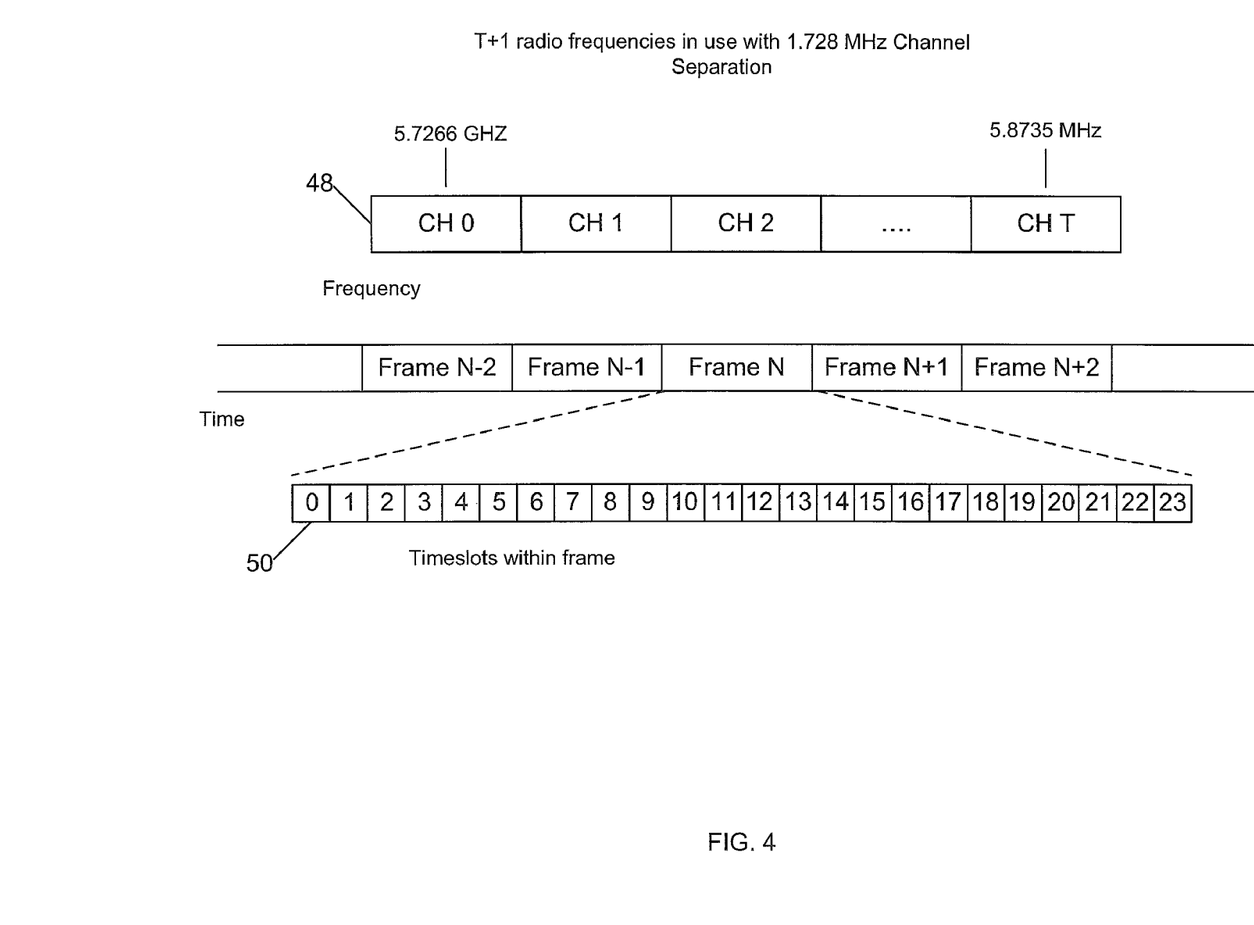
FIG. 4 illustrates a DECT derived 5.8 GHz band plan channel and frame structure in one example.

In one example, the second wireless communications protocol is a DECT derived 5.8 GHz band system. FIG. 4 illustrates a DECT derived 5.8 GHz band plan channel and frame structure in one example. In the example illustrated in FIG. 4, a system having T channels is illustrated. In one implementation, there are eighty-six channels 48 CH0, CH1, . . . , CHT, where T=85 in this example, available for the DECT-derived implementation in the spectrum region around 5.8 GHz. Some channels may not be used because of regulatory limitations in some regions. The eighty-six channels 48 have 1,728 kHz channel separation. The low channel center frequency is 5.7266 GHz and the high channel center frequency is 5.8735 GHz. There are twenty four timeslots 50 per frame, including twelve time slots in a down link direction (i.e., USB device 10 to mobile communication device 20) followed by twelve slots for the uplink direction (i.e., mobile communication device 20 to USB device 10). One of ordinary skill in the art will recognize that where other DECT systems are utilized, such as those in Europe, these figures will vary.

Figure 7:
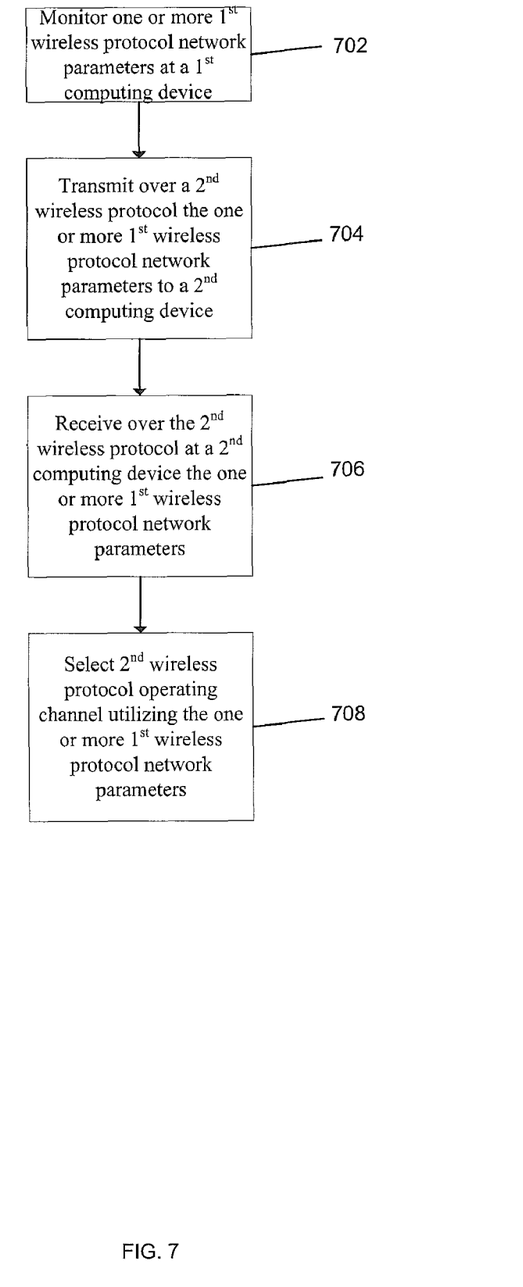
FIG. 7 is a flow diagram illustrating a channel selection process for a mobile communication device in one example.

FIG. 7 is a flow diagram illustrating a channel selection process for a mobile communication device in one example. At block 702, one or more first wireless communications protocol network parameters associated with a first wireless communications protocol is monitored at a first computing device. At block 704, the one or more first wireless protocol network parameters are transmitted over second wireless communications protocol to a second computing device. In one example, the second computing device is a wireless headset. In one example, the first wireless communications protocol is an IEEE 802.11 protocol and the second wireless communications protocol is a DECT protocol.

At block 706, the one or more first wireless communications protocol network parameters are received at the second computing device. In one example, the one or more first wireless communications network parameters include channels utilized, signal levels, and communications message traffic levels for wireless communications network access points and clients in the vicinity of the computing device 2. At block 706, a second wireless communications protocol operating channel is selected utilizing the one or more first wireless communications protocol network parameters.

In one example, receiving the monitored parameter data comprises receiving the channels on which the first wireless transceiver is currently utilizing to transmit or receive data and selecting a second wireless communications protocol operating channel utilizing the monitored parameter data comprises selecting a channel not having overlapping frequencies with the first wireless transceiver channels in use. In a further example, receiving the monitored parameter data comprises receiving the traffic or interference levels on each channel of the first wireless communications protocol and selecting a second wireless communications protocol channel having the least traffic or interference level in view of the received traffic or interference levels associated with the first wireless communications protocol.

Figure 8:
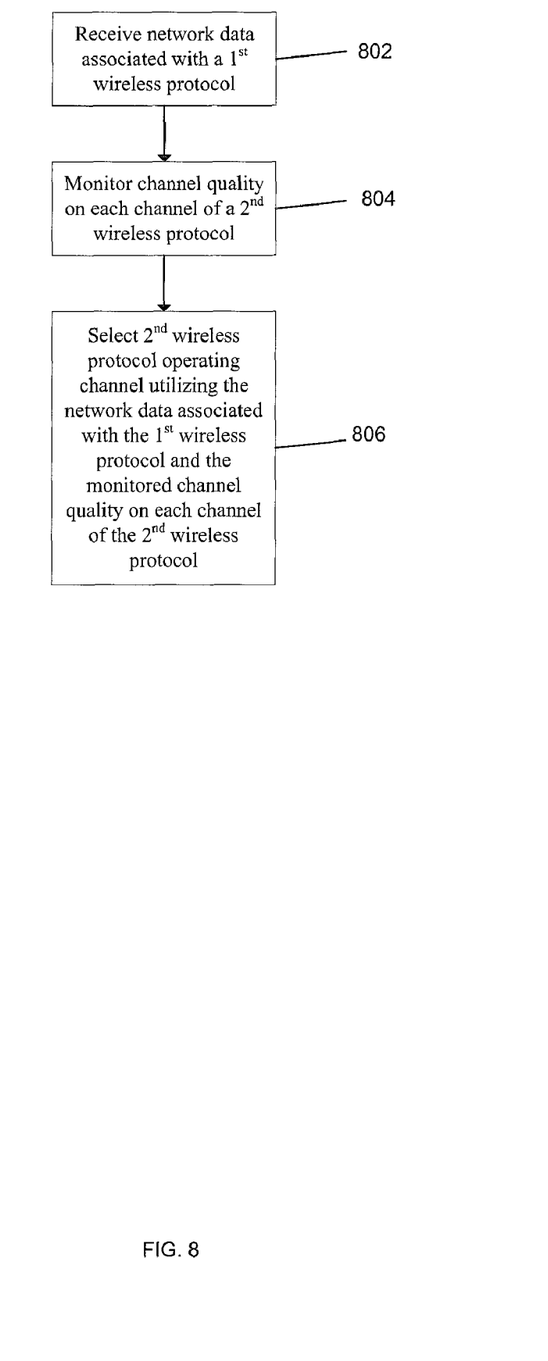
FIG. 8 is a flow diagram illustrating a channel selection process for a mobile communication device in a further example.

FIG. 8 is a flow diagram illustrating a channel selection process for a mobile communication device in a further example. At block 802, network data associated with the first wireless protocol is received. In one example, the network data is received over second wireless communications protocol. In a further example, the network data associated with the first wireless protocol is received and processed at a USB device coupled to a PC. At block 804, the channel quality is monitored for each channel of the second wireless communications protocol available for use.

At block 806, a second wireless communications protocol operating channel is selected at a mobile communication device, such as a headset, utilizing the network data associated with the first wireless communications protocol and the channel quality on each channel of the second wireless communications protocol available for use. Alternatively, the second wireless communications protocol operating channel is selected at a PC or USB device coupled to the PC. In one example, the network data associated with a first wireless communications protocol is a channel currently being used to transmit or receive data. A second wireless communications protocol operating channel at the mobile communication device is selected which does not overlap with the first wireless communications protocol channel currently being used.

Figure 9:
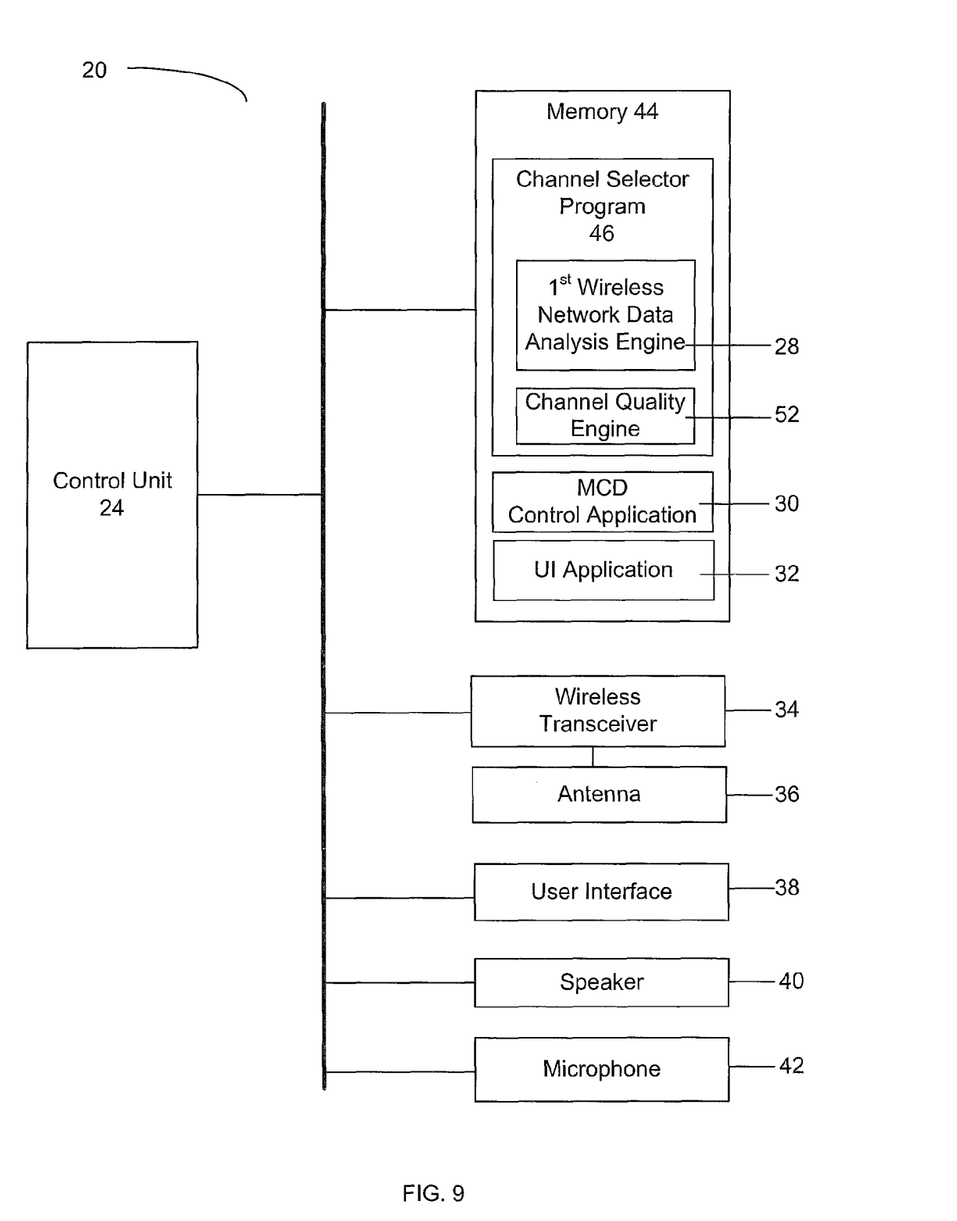
FIG. 9 illustrates a simplified block diagram of a mobile communication device in one example.

FIG. 9 illustrates a simplified block diagram of a mobile communication device with optimized channel selection in one example. Referring to FIG. 9 in conjunction with FIG. 3, a block diagram of an example of mobile communication device 20 is shown. Mobile communication device 20 includes a control unit 24 operably coupled to a memory 44, a wireless transceiver 34 using an antenna 36, a user interface 38, a speaker 40, and a microphone 42. In one example, mobile communication device 20 is a headset and wireless transceiver 34 is a DECT transceiver operating in the 5.8 GHz range.

Control unit 24 allows for processing data, in particular managing RSSI data between wireless transceiver 34 and memory 44 for determining which channel to operate mobile communication device 20. In one example, control unit 24 is a high performance, highly integrated, and highly flexible system-on-chip (SOC) having signal processing functionality. Control unit 24 may include a variety of processors (e.g., digital signal processors), with conventional CPUs being applicable.

Memory 44 may include a variety of memories, and in one example includes SDRAM, ROM, flash memory, or a combination thereof. Memory 44 may further include separate memory structures or a single integrated memory structure. In one example, memory 44 may be used to store passwords, network and telecommunications programs, and/or an operating system (OS). Memory 44 includes a mobile communication device control application 30 and a user interface application 32. User interface 38 allows for manual communication between the device user and the device, and in one example includes an audio and/or visual interface such that a prompt may be provided to the user's ear and/or an LED may be lit.

Memory 44 stores a channel selector 46 executed by control unit 24 to determine the operating channel of the mobile communication device 20. Channel selector 46 includes a first wireless network data analysis engine 28 and channel quality engine 52. Where wireless transceiver 34 utilizes DECT, the first wireless network data corresponds to a wireless communication protocol other than DECT, such as IEEE 802.11.

Channel quality engine 52 is configured to measure the quality of each available channel on which the mobile communication device 20 can transmit and receive data. In one example, the channel quality engine 52 is configured to monitor the interference level of each channel. A constant scan is performed for interference levels for each time slot and for each carrier. In the DECT band, the process of scanning carriers for interference levels is set forth in the DECT regulatory protocol. Referring again to FIG. 4, in this TDMA system with 10 msec transmit framing, within the transmit frame there are twenty four time slots, with twelve for transmit and twelve for receive. For any individual time slot interference levels in both bands are scanned. In one example, a table of interference levels is created.

In one example, the channel selector 46 is configured to receive a plurality of network data associated with a first wireless communications protocol. Responsive to the plurality of first wireless communications protocol network parameter data, the channel selector 46 selects an appropriate second wireless communications protocol channel to operate on, the second wireless communications protocol referring to the protocol used by wireless transceiver 34.

Utilizing first wireless network data analysis engine 28, channel selector 46 is operable to process the plurality of network data associated with the first wireless communications protocol. In one example, the channel selector 46 identifies the first wireless communication protocol channels having the highest traffic or interference levels in order to avoid such channel frequencies when choosing an operating channel. Memory 44 may store network data associated with the first wireless communications protocol for use by channel selector 46 to identify the best second wireless communications protocol channel to operate. The channel selector 46 may implement a variety of algorithms to process the first wireless communications protocol data and select the desired second wireless communications channel.

While the exemplary embodiments of the present invention are described and illustrated herein, it will be appreciated that they are merely illustrative and that modifications can be made to these embodiments without departing from the spirit and scope of the invention. For example, the number of channels available for use will vary depending on the radio system implementation. Where the IEEE 802.11 protocol is discussed, such discussion may refer to any implementation, including IEEE 802.11 a/b/g/n. Furthermore, though reference is made to DECT and IEEE 802.11 in certain examples, other wireless communication protocols are applicable, either within the ISM band or outside the ISM band. Thus, the scope of the invention is intended to be defined only in terms of the following claims as may be amended, with each claim being expressly incorporated into this Description of Specific Embodiments as an embodiment of the invention.

What is claimed is:

1. A system for selecting a channel from a plurality of channels at a mobile communication device comprising:
   a computing device comprising:
      a first wireless transceiver operable to transmit and receive data using a first wireless communications protocol;
      a monitoring application configured to monitor one or more first wireless communications protocol network parameters associated with the first wireless communications protocol;
      a Universal Serial Bus (USB) interface;

a USB device adapted to couple to the USB interface, the USB device comprising a second wireless transceiver operable to transmit and receive data using a second wireless communications protocol;

a mobile communication device comprising a third wireless transceiver operable to transmit and receive data to and from the USB device using the second wireless communications protocol, the mobile communication device adapted to receive the one or more first wireless communications protocol network parameters from the USB device and responsively select a second wireless communications protocol channel from a plurality of channels to transmit or receive data.

2. The system of claim 1, wherein the first wireless communications protocol is an Institute of Electrical and Electronics Engineers (IEEE) 802.11 protocol and the second wireless communications protocol is a Digital Enhanced Cordless Telecommunications (DECT) protocol.

3. The system of claim 1, wherein the computing device is a personal computer and the mobile communication device is a wireless headset.

4. The system of claim 1, wherein the one or more first wireless communications network parameters is selected from the following: channels utilized, signal levels, and communications message traffic levels for wireless communications network access points and clients in a vicinity of the computing device.

5. The system of claim 1, wherein the one or more first wireless communications network parameters are associated with the first wireless transceiver.

6. The system of claim 1, wherein the one or more first wireless communications network parameters are channels on which the first wireless transceiver is currently utilizing to transmit or receive data.

7. The system of claim 1, wherein the monitoring application is configured to monitor traffic or interference levels on each available channel capable of being utilized by the first wireless transceiver.

8. The system of claim 1, wherein the one or more first wireless communications protocol network parameters are channels on which the first wireless transceiver is currently utilizing to transmit or receive data and the mobile communication device responsively selects a second wireless communications protocol channel not overlapping in frequency with the channels.

9. The system of claim 1, wherein the one or more first wireless communications protocol network parameters received are traffic or interference levels on each available channel capable of being utilized by the first wireless transceiver and the mobile communication device selects a second wireless communications protocol channel having a least traffic or interference level in view of the received traffic or interference levels and a measure of an interference level on each second wireless communications protocol channel.

10. The system of claim 1, wherein the mobile communication device is configured to monitor interference levels on each second wireless communications protocol channel capable of being selected to transmit or receive data.

11. A system for selecting a channel from a plurality of channels at a mobile communication device comprising:

a computing device comprising:
 a first wireless transceiver operable to transmit and receive data using a first wireless communications protocol; and
 a monitoring application configured to monitor first wireless communications protocol network data; and a second wireless transceiver operable to transmit and receive data using a second wireless communications protocol, the computing device adapted to process the first wireless communications protocol network data and responsively select a second wireless communications protocol channel to communicate with a mobile communication device, the mobile communication device comprising a third wireless transceiver operable to transmit and receive data to and from the second wireless transceiver.

12. The system of claim 11, wherein the first wireless communications protocol is an Institute of Electrical and Electronics Engineers (IEEE) 802.11 protocol and the second wireless communications protocol is a Digital Enhanced Cordless Telecommunications (DECT) protocol.

13. The system of claim 11, wherein the first wireless communications protocol network data is associated with network usage by the first wireless transceiver.

14. A method for selecting a channel at a mobile communication device comprising:

monitoring a first wireless communications protocol network parameter associated with a first wireless communications protocol;

transmitting monitored parameter data associated with the first wireless communications protocol to a mobile communication device utilizing a second wireless communications protocol;

receiving the monitored parameter data at the mobile communication device; and selecting a second wireless communications protocol operating channel utilizing the monitored parameter data associated with the first wireless communications network parameter.

15. The method of claim 14, wherein the first wireless communications protocol is an Institute of Electrical and Electronics Engineers (IEEE) 802.11 protocol.

16. The method of claim 14, wherein the second wireless communications protocol is a Digital Enhanced Cordless Telecommunications (DECT) protocol.

17. The method of claim 14, wherein the mobile communication device is a wireless headset.

18. The method of claim 14, wherein the first wireless communications network parameter associated with a first wireless communications protocol is one or more selected from the following: channels utilized, signal levels, and communications message traffic levels for wireless communications network access points and clients in a vicinity of the mobile computing device.

19. The method of claim 14, wherein receiving the monitored parameter data comprises receiving the channels on which the first wireless transceiver is currently utilizing to transmit or receive data, and selecting a second wireless communications protocol operating channel comprises selecting a channel not having overlapping frequencies with the channels utilized by the first wireless transceiver.

20. A method for selecting a channel at a mobile communication device comprising:

receiving at a mobile communication device network data associated with a first wireless communications protocol, the network data received over a second wireless communications protocol;

monitoring a channel quality on each channel of the second wireless communications protocol available for use;

selecting a second wireless communications protocol operating channel at the mobile communication device utilizing the network data associated with the first wireless communications protocol and the channel quality on each channel of the second wireless communications protocol available for use.

21. The method of claim 20, wherein the network data associated with a first wireless communications protocol is a channel currently being used to transmit or receive data, wherein selecting a second wireless communications protocol operating channel comprises selecting a second wireless communications protocol operating channel not overlapping with the first wireless communications protocol channel currently being used to transmit or receive data.

22. The method of claim 20, wherein the network data associated with a first wireless communications protocol comprises traffic or interference levels on each channel of the first wireless communications protocol.

23. A mobile communication device comprising:
a processor;
a transceiver to transmit and receive data using a wireless communications protocol;
an antenna; and
a memory storing a channel selection application configured to receive a plurality of network data associated with a different wireless communications protocol, wherein the channel selection application is configured to select a channel from a plurality of available channels using the plurality of network data associated with the different wireless communications protocol.

24. The mobile communication device of claim 23, wherein the wireless communications protocol is Digital Enhanced Cordless Telecommunications (DECT) and the different wireless communications protocol is Institute of Electrical and Electronics Engineers (IEEE) 802.11.

25. The mobile communication device of claim 23, wherein the plurality of network data comprises interference levels for each channel of the different wireless communications protocol, and the channel selection application is configured to select a channel having a low interference level.

* * * * *